US008665977B2

(12) United States Patent
Cheng et al.

(10) Patent No.: US 8,665,977 B2
(45) Date of Patent: Mar. 4, 2014

(54) MULTILEVEL CLUSTER-BASED MIMO DETECTION METHOD AND MIMO DETECTOR THEREOF

(75) Inventors: Shau-Yu Cheng, Hsinchu County (TW); Cheng-Yuan Lee, Taichung County (TW); Wei-Chi Lai, Taoyuan County (TW); Terng-Yin Hsu, Yunlin County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1220 days.

(21) Appl. No.: 12/550,422

(22) Filed: Aug. 31, 2009

(65) Prior Publication Data
US 2010/0054365 A1 Mar. 4, 2010

Related U.S. Application Data (60) Provisional application No. 61/093,355, filed on Aug. 31, 2008.

(51) Int. Cl.
*H04L 5/12* (2006.01)
*H04L 23/02* (2006.01)

(52) U.S. Cl.
USPC ........... 375/262; 375/261; 375/263; 375/325; 375/340; 375/346

(58) Field of Classification Search
USPC ................. 375/259–269, 285, 295–298, 316, 375/322–325, 340–341, 346–350
See application file for complete search history.

(56) References Cited

U.S. PATENT DOCUMENTS 7,308,047 B2    12/2007 Sadowsky
2005/0141644 A1*  6/2005 Sadowsky ..................... 375/324

OTHER PUBLICATIONS

T. D. Chiueh and P. Y. Tsai, OFDM Baseband Receiver Design for Wireless Communications. Wiley, pp. 158-167. Sep. 2007.
X. Zhu and R. D. Murch, Performance analysis of maximum likelihood detection in a MIMO antenna system, IEEE Trans. Commun., vol. 50, pp. 187-191, Feb. 2002.
E. Viterbo and J. Boutros, A universal lattice code decoder for fading channels, IEEE Trans. Inf. Theory, vol. 45, No. 5, pp. 1639-1642, Jul. 1999.
Approximate ML detection for MIMO systems with very low complexity, ICASSP '04, vol. 4, No., pp. iv-809-iv-812 vol. 4, May 17-21, 2004.
V. Erceg, et al, "TGn Channel Models", doc: IEEE 802.11-03/940r4, pp. 8-25, May 2004.
P. W. Wolniansky, V-BLAST: An Architecture for Realizing Very High Data Rates Over the Rich-Scattering Wireless Channel, 1998.

(Continued)

*Primary Examiner* — Leon Flores
*Assistant Examiner* — James M Perez
(74) *Attorney, Agent, or Firm* — McClure, Qualey & Rodack, LLP (57) ABSTRACT

A MIMO detection method for a receiver in a MIMO system using N-QAM for modulation, the MIMO detection method including generating a plurality of symbol vector sets and a plurality of search radiuses, selecting a candidate symbol vector set corresponding to a highest level of a multilevel structure of N-QAM constellation, generating a search space corresponding to a lower level of the multilevel structure of N-QAM constellation according to the selected candidate symbol vector set, confirming which level the search space corresponds to, and generating a detection signal according to the search space when the level of the search space is the lowest level of the multilevel structure of the N-QAM constellation.

16 Claims, 9 Drawing Sheets

(56) References Cited

OTHER PUBLICATIONS

Yugang Jia, Depth-First and Breadth-First Search Based Multilevel SGA Algorithms for Near Optimal Symbol Detection in MIMO Systems, Mar. 2008.

Yvo L. C., Iterative Tree Search Detection for MIMO Wireless Systems, Jun. 2005.

Yvo L.C., Iterative Trellis Search Detection for Asynchronous MIMO Systems, 2003.

* cited by examiner

MULTILEVEL CLUSTER-BASED MIMO DETECTION METHOD AND MIMO DETECTOR THEREOF

CROSS REFERENCE TO RELATED APPLICATIONS

This application claims the benefit of U.S. Provisional Application No. 61/093,355, filed on Aug. 31, 2008 and entitled "Multilevel Cluster-Based MIMO Detection", the contents of which are incorporated herein.

BACKGROUND OF THE INVENTION

1. Field of the Invention

The present invention relates to a wireless communication system, and more particularly, to MIMO communication system.

2. Description of the Prior Art

Multiple-Input Multiple-Output (MIMO) technology utilizes antenna array to receive and transmit signals, which increases channel capacity with present spectrum resource, prevents signal loss caused by multiple-path, and meanwhile increases communication coverage. The present wireless communication standards, such as IEEE 802.11n used by wireless local area network, IEEE 802.16 used by WiMax, and long term evolution (LTE) initiated by the 3rd Generation Partnership Project (3GPP) all utilize MIMO technology to increase transmission throughput. On the other hand, high order quadrature amplitude modulation (QAM) technology is widespread applied in the abovementioned wireless communication standards.

A $N_T \times N_R$ MIMO system has $N_T$ transmitted antennas and $N_R$ received antennas. A transmitted signal is represented as $x = [x_1, x_2, \ldots x_j, \ldots, x_{N_T}]^T$, wherein $x_j$ indicates a signal transmitted by the $j^{th}$ transmitted antenna and corresponds to a symbol of QAM constellation, also called a constellation point. T indicates a transpose matrix. A received signal of the $N_T \times N_R$ MIMO system can be indicated as $y = [y_1, y_2, \ldots y_j, \ldots, y_{N_R}]^T$ wherein $y_j$ indicates a signal received by the $j^{th}$ received antenna. The received signal can be indicated as $y = Hx + n$, where H is a channel matrix of $N_R \times N_T$, and n is additive white Gaussian noise (AWGN). Please refer to FIG. 1, which is a schematic diagram of a 4×4 MIMO system 10. In a transmitter of the MIMO system 10, a data stream goes through a QAM unit 102 for modulation, and is transformed to a transmitted signal $x = [x_1, x_2, x_3, x_4]^T$. After the transmitted signal is processed to be a radio frequency (RF) signal, the RF signal is transmitted to channels by antennas T1-T4. After antennas R1-R4 of a receiver of the MIMO system 10 receives the RF signal, and the RF signal goes through the RF signal process for generating a received signal $y = [y_1, y_2, y_3, y_4]^T$ to a MIMO detector 104. As can be seem in FIG. 1, each received antennas R1-R4 receives a signal transmitted from the transmitted antennas T1-T4, causing interference between signals transmitted from different antennas. The MIMO detector 104 generates an estimated transmitted signal $\hat{x} = [\hat{x}_1, \hat{x}_2, \hat{x}_3, \hat{x}_4]^T$ according to the received signal $y = [y_1, y_2, y_3, y_4]^T$, and the estimated transmitted signal is demodulated by a QAM unit 106 to generate a valid transmitted signal.

The prior art provides various MIMO detection methods. Following is a brief introduction. Linear MIMO detection method, such as zero-forcing (ZF) algorithm and minimum mean square error (MMSE) algorithm, performs inverse matrix operation for an estimated channel matrix to extract the transmitted signal. An operation of ZF algorithm can be regarded as a filter, which can remove inter-symbol interference (ISI), but enhance noise. On the other hand, MMSE algorithm cannot remove ISI completely, but does not enhance noise. Both methods are simple to be implemented, but have limited efficiency In addition, nonlinear MIMO detection method includes vertical bell laboratories layered space time (V-BLAST) algorithm, maximum likelihood (ML) algorithm, sphere decoding (SD) algorithm, etc. The V-BLAST algorithm utilizes QR decomposition of matrix operation for successive interference cancellation. Compared to ZF and MMSE algorithm, V-BLAST algorithm has better performance. The maximum likelihood (ML) algorithm compares a received symbol vector and symbol vectors in transmitted signal space one by one, to detect the most possible symbol vector for transmission. ML algorithm has the best performance, but has the most complexity of all the algorithms. SD algorithm reduces the number of candidate symbol vectors and the complexity according to the setting of a search range, and has optimal performance with ML algorithm. However, a channel effect affects a process of determining a search radius of SD algorithm under the condition of low signal-to-noise ratio (SNR), and increases the complexity.

Besides the abovementioned algorithms, some methods use N-dimension QAM constellation with multilevel structure for decreasing the search range, to reduce the complexity. A brief description of the multilevel structure of N-QAM constellation is as following. An N-QAM constellation can be recursive partitioned to L levels, where $L = \log_4 N$. A mean symbol vector set $S^l$ at level l is $$S^l = \{s_i^l\}, i=1,2,\ldots,N_l, N_l = 4^{1-l} \times N.$$

Figure 2:
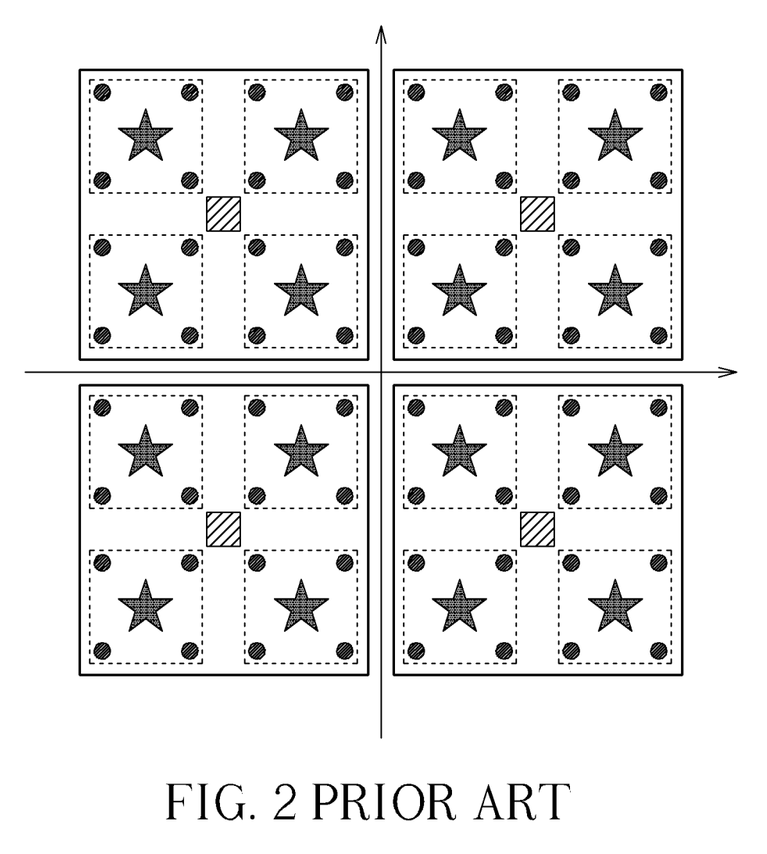
FIG. 2 is a schematic diagram of conventional 64-QAM constellation.

Please refer to FIG. 2, which is a diagram of 64-QAM constellation according to the prior art. 64-QAM constellation is partitioned into four sets according to the four quadrants of I-Q plane. Each 16-QAM constellation can be further partitioned into four sets 4-QAM constellation. The mean symbol set $S^l$ at the first level (which is also the lowest level) of the 64-QAM constellation includes 64 symbols. A mean value of all the symbols in each 4-QAM constellation is indicated as a mean symbol, such as a star point. As a result, a mean symbol set $S^2 = \{s_1^2, s_2^2, \ldots, s_{16}^2\}$ at the second level includes 16 mean symbols. In the mean symbol set $S^2$ at the second level, a mean value of four mean symbols in the same quadrant is indicated as a second mean symbol, such as a square point. Likewise, a mean symbol set $S^3 = \{s_1^3, s_2^3, s_3^3, s_4^3\}$ at the third level includes four mean symbols. The mean symbol $s_i^l$ at the $l^{th}$ level is the average of four mean symbols coupled to the mean symbol $s_i^l$ at the $(l-1)^{th}$ level; the mean symbol $s_i^l$ is $$s_i^l = \left( \sum_{s_j^{l-1} \in S_{s,i}^{l-1}} s_j^{l-1} \right) / 4.$$

$S_{s,i}^{l-1}$ is a subset of a mean symbol set $S^{l-1}$, which includes four mean symbols coupled to the mean symbol $s_i^l$. The transmitted signal of the $N_T \times N_R$ MIMO system is represented as $x^l = [x_1^l, x_2^l, \ldots, x_{N_T}^l]^T$ according to a transmitted signal space formed by the mean symbol set at the $l^{th}$ level, where $x_1^l, x_2^l, \ldots, x_{N_T}^l$ indicates symbol vectors transmitted from the 1, 2, ... $N_T$ transmitted antennas, and the symbol vector transmitted from each antenna corresponds to a mean symbol in the mean symbol set $S^l$. As can be seen, the overall mean symbol vector set $X^l$ transmitted from the $N_T \times N_R$ MIMO system is $$X^l = \{x^{l,i}\}, i=1,2,\ldots,N_l^{N_T}.$$

Figure 1:
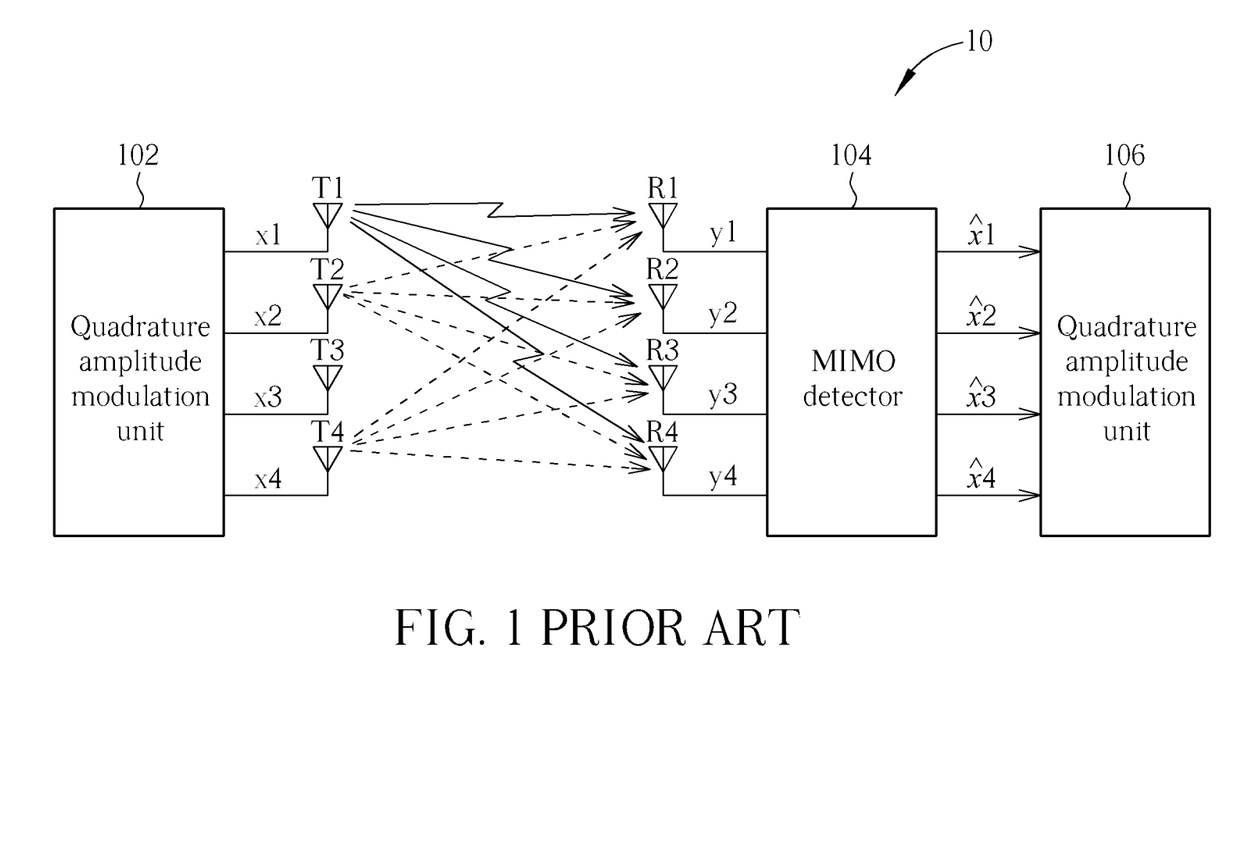
FIG. 1 is a schematic diagram of a conventional 4×4 MIMO system.

Take 4×4 MIMO system 10 in FIG. 1 as an example. 64-QAM is utilized for performing signal modulation and forming a search space according the mean symbol set at the second level. Then, the mean symbol vector set $X^2$ includes $16^4$ different mean symbol vectors. A cluster $C^{l,i}$ corresponding to a mean symbol vector $x^{l,i}$ includes $4^{N_T}$ mean symbol vectors at the $(l-1)^{th}$ level coupled to the mean symbol vector $x^{l,i}$, which can be regarded as a subset of a mean symbol vector $X^{l-1}$. The cluster $C^{l,i}$ is $$C^{l,i} = \{x_i^{l-1} | x_1^{l-1} \in S_{\alpha,1}^{l-1}, x_2^{l-1} \in S_{\alpha,2}^{l-1}, \ldots, x_{N_T}^{l-1} \in S_{\alpha,N_T}^{l-1}\}.$$

Assume that the received signal y is a result of the transmitted signal x passed through the channel matrix H, a mean symbol vector $x^l$ in the mean symbol vector set at the $l^{th}$ level has the minimum distance with the transmitted signal x. A Euclidean distance of an error vector between the transmitted signal x and the mean symbol vector $x^l$ passed through the channel is $$\|Hx - Hx^l\|^2 = \|H(x-x^l)\|^2 = (x-x^l)^H H^H H (x-x^l).$$

Since each channel of the MIMO system affects each other, the abovementioned equation can only confirm that $H^H H$ diagonal element is a positive real number. Therefore, $\|Hx - Hx^l\|^2$ may not be proportion to $\|(x-x^l)\|^2$. In other words, after the mean symbol vector $x^l$ which is the nearest to the transmitted signal x in the transmitted signal space are transmitted through the channel, the mean symbol vector $x^l$ may not be a mean symbol vector which is the nearest to the received signal y in the received signal space, and system error occurs.

The method published in "Depth-First and Breadth-First Search Based Multilevel SGA Algorithms for Near Optimal Symbol Detection in MIMO Systems" provides depth-first search or breadth-first search to extract possible transmitted signals by sequential Gaussian approximation (SGA) algorithm which uses ZF algorithm, causing performance degradation. On the other hand, U.S. Pat. No. 7,308,047 discloses a method for detecting the most similar signal to the transmitted signal in the received signal space without performing the inverse matrix operation of the channel matrix. However, the method disclosed by the U.S. Pat. No. 7,308,047 causes serious system error and error floor effect at low bit error rate (BER).

Although the abovementioned multilevel structure of the QAM technology for detecting transmitted signal can reduce the system complexity, a problem of system error is still needed to conquer, for enhance accuracy of the MIMO detection. The MIMO detection method has to be improved constantly for adapting an amount of data transmission, and meanwhile takes low complexity and high performance into account.

SUMMARY OF THE INVENTION

Therefore, the present invention provides a MIMO detection method utilized in a receiver of a MIMO system and related MIMO detector, for reducing the complexity of the MIMO system.

The present invention discloses a MIMO, an abbreviation of multiple-input multiple-output, detection method for a receiver in a MIMO system using N-QAM, an abbreviation of quadrature amplitude modulation. The MIMO detection method includes generating a plurality of symbol vector sets and a plurality of search radiuses, each symbol vector set and search radius correspond to one level of a multilevel structure of N-QAM constellation, selecting a candidate symbol vector set at a highest level of the multilevel structure of N-QAM constellation, generating a search space at a lower level of the multilevel structure according to the candidate symbol vector set, confirming which level the search space corresponds to, and generating a detection signal according to the search space when the level of the search space is the lowest level of the multilevel structure.

These and other objectives of the present invention will no doubt become obvious to those of ordinary skill in the art after reading the following detailed description of the preferred embodiment that is illustrated in the various figures and drawings.

DETAILED DESCRIPTION

As abovementioned, N-QAM constellation has a characteristic of a multilevel structure, and thereby the present invention discloses a MIMO detection method which performs two-stage search in a received signal space. The first stage is called "cluster matching" which is a breadth-first search, and the second stage is called "detail matching". Cluster matching begins at the highest level (namely the $L^{th}$ level, where $L = \log_4 N$) of the multilevel structure of N-QAM constellation. A mean symbol vector set $X^L$ at the $L^{th}$ level is considered as an initial search space, and cluster matching is performed for each of (L−1) levels for reducing the search space, so as to find a cluster whose symbol vectors have minimal distances with the transmitted signal. Detail matching is performed at the lowest level of the multilevel structure of N-QAM constellation, namely the first level (which is also the lowest level), to find a symbol vector which has a minimal distance with the transmitted signal, also the most possible symbol vector for being the transmitted signal.

Firstly, a $N_T \times N_R$ MIMO system is defined in the present invention, where a transmitter includes $N_T$ transmitted antennas and a receiver includes $N_R$ received antennas. N-QAM is utilized for modulating a transmitted data stream. A transmitted signal is indicated as $x = [x_1, x_2, \ldots x_j, \ldots, x_{N_T}]^T$, wherein $x_j$ indicates a signal transmitted by the $j^{th}$ transmitted antenna and is represented by N-QAM constellation. A received signal is indicated as $y = [y_1, y_2, \ldots y_j, \ldots, x_{N_R}]^T$ wherein $y_j$ indicates a signal received by the $j^{th}$ received antenna. N-QAM constellation can be partitioned to L levels, where $L = \log_4 N$. A mean symbol vector set $S^l$ at the $l^{th}$ level ($1 \le l \le L$) is indicated as $S^l = \{s_i^l\}, i=1,2,\ldots,N_l, N_l = 4^{1-l} \times N$. For example, the mean symbol set at the highest level of the multilevel structure of N-QAM constellation includes four mean symbols, and the mean symbol set at the lowest level is N symbols in N-QAM constellation. For the $N_T \times N_R$ MIMO system, a mean symbol vector set at the $l^{th}$ level of the multilevel structure of N-QAM constellation is indicated as $X^l = \{x^{l,i}\}$, $i=1, 2, \ldots, N_l^{N_T}$, where each element of a mean symbol vector $x^{l,i}$ corresponds to a transmitted antenna. A cluster $C^{l,i}$ includes $4^{N_T}$ mean symbol vectors at the $(l-1)^{th}$ level coupled to the mean symbol vector $x^{l,i}$ at the $l^{th}$ level, which can be regarded as a subset of a mean symbol vector set $X^{l-1}$. The following mathematical symbols and the meaning of other sets can be referred to the abovementioned description, so the detailed description is omitted herein.

Figure 3:
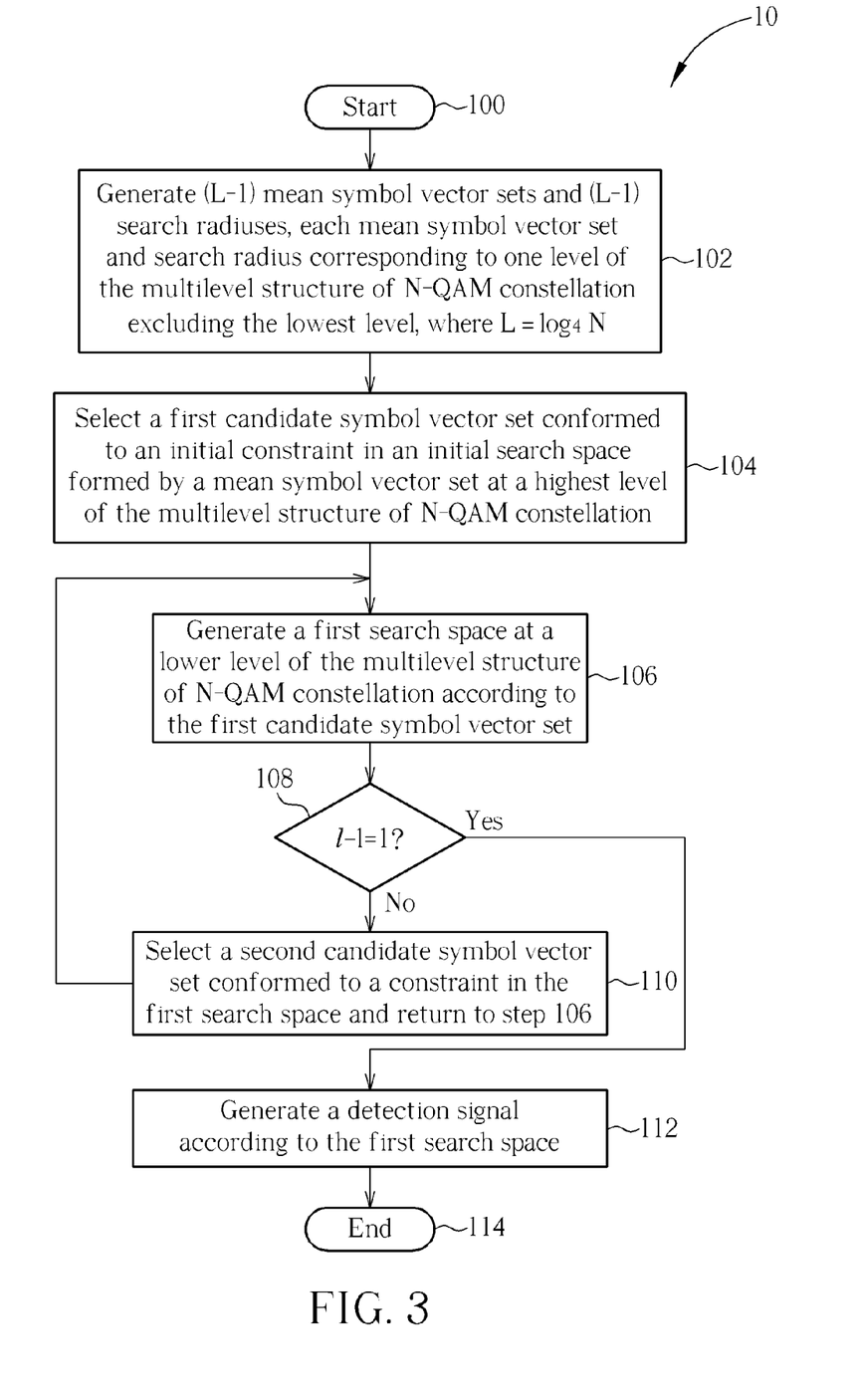
FIG. 3 is a flowchart diagram of a MIMO detection method according to an embodiment of the present invention.

Please refer to FIG. 3, which is a flowchart of a MIMO detection method 10 according to an embodiment of the present invention. The MIMO detection method 10 includes the following steps:

Step 100: Start.

Step 102: Generate (L-1) mean symbol vector sets and (L-1) search radiuses, each mean symbol vector set and search radius corresponding to one level of the multilevel structure of N-QAM constellation excluding the lowest level, where $L=\log_4 N$.

Step 104: Select a first candidate symbol vector set conformed to an initial constraint in an initial search space formed by a mean symbol vector set at the highest level of the multilevel structure of N-QAM constellation.

Step 106: Generate a first search space at a lower level of the multilevel structure of N-QAM constellation according to the first candidate symbol vector set.

Step 108: Confirm which level of the multilevel structure of N-QAM constellation the first search space corresponds to. Perform step 112 if the level is the lowest level of the multilevel structure of N-QAM constellation; otherwise perform step 110.

Step 110: Select a second candidate symbol vector set conformed to a constraint in the first search space and return to step 106.

Step 112: Generate a detection signal according to the first search space.

Step 114: End.

Cluster matching stage is illustrated with step 104 to step 110, wherein step 106 to step 110 are performed as a loop for cluster matching level by level. Step 108 is utilized for confirming whether cluster matching stage is completed. Step 112 illustrates the detail matching stage at the lowest level. The initial search space corresponds to a mean symbol vector set $X^L$ at the $L^{th}$ level of the multilevel structure of N-QAM constellation. Take a 4×4 MIMO system as an example. If 64-QAM is used, the initial search space, $\Pi^L = X^3 = \{x^{3,i}\}$, $i=1, 2, \ldots, 256$, includes 256 mean symbol vectors. The meaning of an initial constraint of cluster matching at the highest level is the same with constraints of the following cluster matching at each level. A constraint of a search space $\Pi^l$ is used for selecting those mean symbol vectors in the search space $\Pi^l$, namely a candidate symbol vector set $\Omega^l$, in which each mean symbol vector $x^{l,i}$ corresponds to an error vector between the received signal y and the mean symbol vector $x^{l,i}$ passed through the channel, each error vector having a Euclidean distance smaller than a search radiuses $\gamma^l$. Cluster matching at each level may use different search radiuses whose detailed description of setting method can be referred to the following statement. The constraint used by cluster matching at the $l^{th}$ level ($1 < l \leq L$) is expressed by the following inequality (1), and the candidate symbol vector set $\Omega^l$ is defined by (2):

$$\|y - Hx^{l,i}\| < \gamma^l; \quad (1)$$

$$\Omega^l : \{x^{l,i} | x^{l,i} \in \Pi^l, \|y - Hx^{l,i}\| < \gamma^l\}, \Omega^l \subseteq \Pi^l, \Pi^l \subseteq X^l. \quad (2)$$

In step 104, the MIMO detection method 10 performs cluster matching at the highest level, to search the candidate symbol vector set $\Omega^L$ conformed to the initial constraint, $\|y - Hx^{L,i}\| < \gamma^L$. Step 106 to step 110 illustrates cluster matching level by level, and uses the $l^{th}$ level for explanation herein. In step 106, the MIMO detection method 10 generates a search space $\Pi^{l-1}$ at the $(l-1)^{th}$ level which is one level lower than the $L^{th}$ level of the multilevel structure of N-QAM constellation according to the candidate symbol vector set $\Omega^L$. A set of $4^{N_T}$ mean symbol vectors at the $(l-1)^{th}$ level coupled to each mean symbol vector $x^{l,i}$ in the candidate symbol vector set $\Omega^l$ is defined as a cluster $C^{l,i}$. Therefore, a search space $\Pi^{l-1}$ is equivalent to a set of multiple clusters $C^{l,i}$, and in other words, selecting candidate symbol vector sets intends selecting candidate clusters.

In step 108, the MIMO detection method 10 confirms a level of the search space $\Pi^{l-1}$, for confirming whether cluster matching stage is completed. If $(l-1)=1$, the level of the search space $\Pi^{l-1}$ is the lowest level of the multilevel structure of N-QAM constellation, which indicates cluster matching stage is completed. If $(l-1) \neq 1$, the level of the search space $\Pi^{l-1}$ is not the lowest level of the multilevel structure of N-QAM constellation. In this situation, the MIMO detection method 10 returns to step 106, and performs loop operation of step 106 to step 110 until the search space at the lowest level is generated. In cluster matching stage, the MIMO detection method 10 utilizes the constraint for searching candidate symbol vector set $\Omega^l$. The Euclidean distance of an error vector between each mean symbol vector of the candidate symbol vector set $\Omega^l$ passed through channels and the received signal y is smaller than the search radius $\gamma^l$. From the above, the MIMO detection method 10 eliminates mean symbol vectors which are not conformed to the constraint for reducing the search space level by level.

The MIMO detection method 10 enters detail matching stage when the cluster matching is performed at the lowest level, for generating the MIMO detection output signal that is an estimated transmitted signal. Step 112 further includes two ways for generating the output signal, which can be a hard-decision output signal or a soft-decision output signal. For generating a hard-decision output signal, step 114 utilizes maximum likelihood algorithm in the search space $\Pi^l$ at the lowest level, for selecting a symbol vector $\hat{x}$ which satisfies a condition that a Euclidean distance of an error vector between the symbol vector $\hat{x}$ passed through channels and the received signal y is the minimum, namely a hard-decision output signal. The selected symbol vector $\hat{x}$ is $$\hat{x} = \underset{x^{1,i} \in \prod^1}{\operatorname{argmin}} \|y - Hx^{1,i}\|. \quad (3)$$

On the other hand, the present invention can generate a soft-decision output signal for coordinating a back end, Viterbi decoder, of the MIMO detector. In this situation, step 112 calculates a Euclidean distance of an error vector between each symbol vector in the search space $\Pi^l$ passed through channels and the received signal y, sorts all symbol vectors in search space $\Pi^l$ in order according to values of Euclidean distances of all error vectors, and selects K symbol vectors which is corresponded to K error vectors with minimal Euclidean distances, for generating the soft-decision output signal. For example, the embodiment of the present invention selects four symbol vectors $(x^{1,1}, x^{1,2}, x^{1,3}, x^{1,4})$ corresponding to four minimal Euclidean distances $(d_1, d_2, d_3, d_4)$ of Euclidean distances of all error vectors. The soft-decision output signal $\hat{x}$ is generated by the giving different weightings to the four symbol vectors ($x^{1,1}$, $x^{1,2}$, $x^{1,3}$, $x^{1,4}$), given as following equations:

$$w_1 = \left(\frac{1}{d_1}\right)^4, w_2 = \left(\frac{1}{d_2}\right)^4, w_3 = \left(\frac{1}{d_3}\right)^4, w_4 = \left(\frac{1}{d_4}\right)^4, \quad (4)$$

$$D = w_1 + w_2 + w_3 + w_4, \quad (5)$$

$$\hat{x} = \frac{w_1}{D}x^{1,1} + \frac{w_2}{D}x^{1,2} + \frac{w_3}{D}x^{1,3} + \frac{w_4}{D}x^{1,4}. \quad (6)$$

Figure 4:
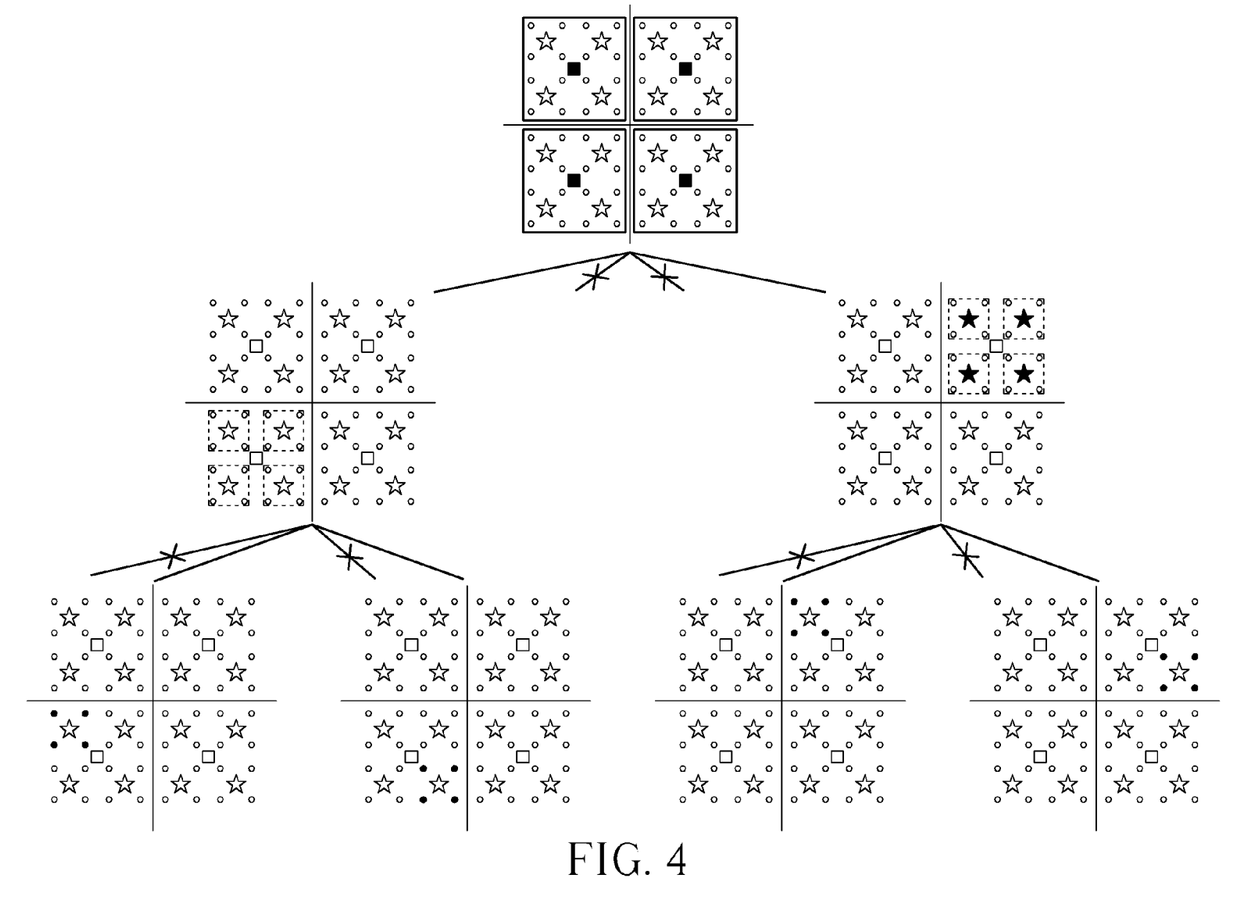
FIG. 4 is a schematic diagram of a multilevel structure of 64-QAM constellation based on the MIMO detection method in FIG. 3.

Please refer to FIG. 4, which is a schematic diagram of a multilevel structure of 64-QAM constellation based on the MIMO detection method 10. FIG. 4 briefly indicates an element of a transmitted signal corresponding to one of multiple transmitted antennas. As can be seen in FIG. 4, 64-QAM constellation is partitioned into three levels and the search space is reduced level by level. Finally, only 16 symbol vectors of the symbol vector set at the lowest level of 64-QAM constellation is left when detail matching is performed, such as points at the first level. The MIMO detection method 10 only performs comparison for the 16 symbol vectors. Compared with maximum likelihood algorithm, which compares each symbol vector in the constellation and the received signal and has the best performance, the embodiment of the present invention detects the transmitted symbol vector via cluster matching stage and detail matching stage for greatly reducing the search space, so as to decrease system complexity.

Figure 5:
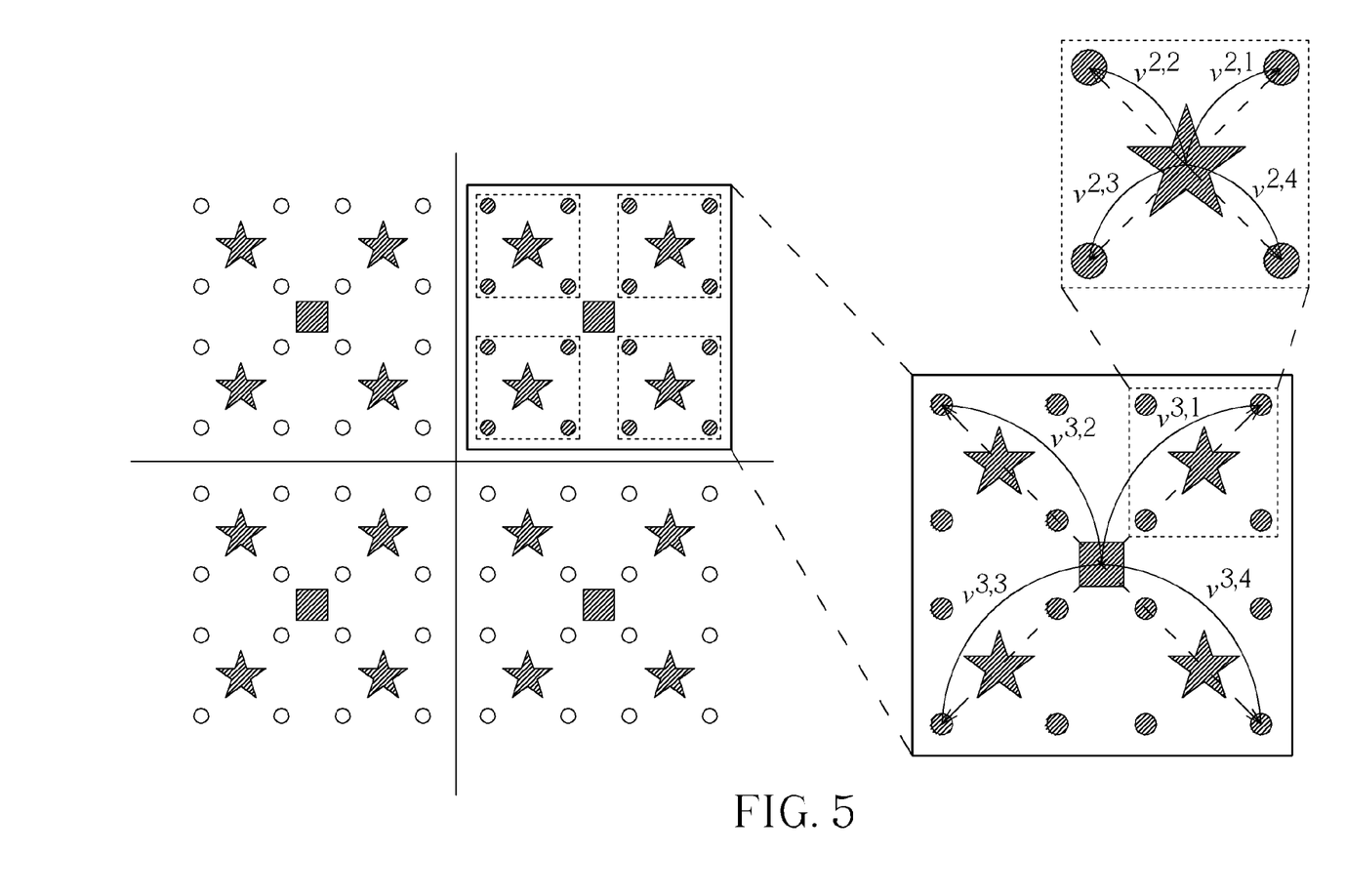
FIG. 5 is a schematic diagram of a constraint vector according to an embodiment of the present invention.

The setting method of search radius in the MIMO detection method 10 is illustrated as following. Firstly, a constraint vector is defined as $v^{l,c}=(x^{1,c}-x^{l,i})$, where $x^{l,i}$ is a mean symbol vector at the $l^{th}$ level of the multilevel structure of N-QAM constellation and corresponds to the $i^{th}$ partition of the lowest level of N-QAM constellation, and $x^{1,c}$ is a symbol vector, where c=1,2, ... $4^{N_T}$, each element of the symbol vector $x^{1,c}$ is one of four corner constellation points of the $i^{th}$ partition at the lowest level of N-QAM constellation. Each mean symbol vector $x^{l,i}$ corresponds to $4^{N_T}$ constraint vectors. Please refer to FIG. 5, which is a schematic diagram of constraint vectors. FIG. 5 shows four constraint vectors $v^{3,1}$, $v^{3,2}$, $v^{3,3}$, $v^{3,4}$ corresponded to an element of a mean symbol vector $x^{3,i}$ (such as a square point) at the third level of 64-QAM constellation, and four constraint vectors $v^{2,1}$, $v^{2,2}$, $v^{2,3}$, $v^{2,4}$ corresponded to an element of a mean symbol vector $x^{2,i}$ (such as a star point) at the second level. In a case of without additive white Gaussian noise, Euclidean distance of an error vector $z=[z_1, z_2, \ldots, z_{N_R}]^T$ between the mean symbol vector $x^{l,i}$ passed through channels and received signal y is $$\|z\|=\|y-Hx^{l,i}\|=\|Hx^{1,k}-Hx^{l,i}\|=\|H(x^{1,k}-x^{l,i})\|\le\|Hv^{l,c}\|. \quad (7)$$

In the transmitted signal space, lengths of constraint vectors $v^{l,c}$ corresponding to the mean symbol vector $x^{l,i}$ are equal. However, each channel of the MIMO system has different gain, so the lengths of constraint vectors $v^{l,c}$ in received signal space are no longer the same. A maximum value $d^l$ of Euclidean distance of the error vector z is $$d^l=\max\{\|Hv^{l,c}\|\}, c=1,2,\ldots,4^{N_T}. \quad (8)$$

The present invention further considers an effect of noise, and defines the search radius $\gamma^l$ of cluster matching at the $l^{th}$ level being the product of the largest value $d^l$ of Euclidean distances of error vector z, and a noise reduction parameter $\alpha_l$, that is $\gamma^l=\alpha_l \cdot d^l$, where $\alpha_l$ is a real number greater than 1. The higher level of cluster matching uses the larger search radius, and the noise reduction parameter enhances the efficiency of MIMO detection more obviously.

Note that, the MIMO detection method 10 selects mean symbol vectors $x^{l,i}$ at the $l^{th}$ level conformed to constraint $\|y-Hx^{l,i}\|<\gamma^l$ by calculating a full Euclidean distance of each error vector z for determining whether the mean symbol vector $x^{l,i}$ is conformed to the constraint. In a case of a large number of transmitted antennas, calculation of the full Euclidean distance increases the loading of the MIMO system certainly. Therefore, the present invention provides a branch and bound method for reducing the search space quickly, which calculates a partial Euclidean distance of the error vector z for eliminating the mean symbol vector $x^{l,i}$ which is not conformed to the constraint. Mathematic principle of the branch and bound method is summarized as following. Firstly, the present invention utilizes QR decomposition to decompose the channel matrix H into a product of a unitary matrix Q and a upper triangular matrix R. Euclidean distance of the error vector z is $$\|z\|=\|y-Hx^{l,i}\|=\|y-QRx^{l,i}\|=\|y'-Rx^{l,i}\|<\gamma^l. \quad (9)$$

In equation (9), $z=y'-Rx^{l,i}$ expressed with matrix:

$$\begin{bmatrix} z_1 \\ z_2 \\ \vdots \\ z_{N_R} \end{bmatrix} = \begin{bmatrix} y'_1 \\ y'_2 \\ \vdots \\ y'_{N_R} \end{bmatrix} - \begin{bmatrix} r_{11} & r_{12} & \cdots & r_{1N_T} \\ 0 & r_{22} & \cdots & r_{2N_T} \\ \vdots & \ddots & \ddots & \vdots \\ 0 & \cdots & 0 & r_{N_R N_T} \end{bmatrix} \begin{bmatrix} x_1^{l,i} \\ x_2^{l,i} \\ \vdots \\ x_{N_T}^{l,i} \end{bmatrix}. \quad (10)$$

In equation (10), a Euclidean distance of each element of the error vector z is $$\|z_j\|^2 = \left\| y_j - \sum_{k=j}^{N_T} r_{jk} x_k^{l,i} \right\|^2, 1 \le j \le N_R. \quad (11)$$

A partial error vector $z^{(j)}$ and the corresponding partial Euclidean distance are $$z^{(j)} = [z_j, z_{j+1}, \ldots, z_{N_R}]^T, 1 \le j \le N_R, \quad (12)$$

and $$\|z^{(j)}\|^2 = \sum_{k=j}^{N_R} \|z_k\|^2 \quad (13)$$
$$= \|z_j\|^2 + \|z_{j+1}\|^2 + \ldots + \|z_{N_R}\|^2$$
$$= \|z_j\|^2 + \|z^{(j+1)}\|^2.$$

As can be seen in equation (9) and equation (13), the mean symbol vector $x^{l,i}$ conformed to the constraint makes the following equations true:

$$\|z^{(N_R)}\|^2 = \|z_{N_R}\|^2 < (\gamma^l)^2, \quad (14)$$

$$\|z^{(N_R-1)}\|^2 = \|z_{N_R-1}\|^2 + \|z_{N_R}\|^2 < (\gamma^l)^2, \quad (15)$$

$$\|z^{(N_R-2)}\|^2 = \|z_{N_R-2}\|^2 + \|z_{N_R-1}\|^2 + \|z_{N_R}\|^2 < (\gamma^l)^2, \quad (16)$$

$$\|z^{(1)}\|^2 = \|z_1\|^2 + \|z_2\|^2 + \ldots + \|z_{N_R-1}\|^2 + \|z_{N_R}\|^2 < (\gamma^l)^2. \quad (17)$$

Figure 6:
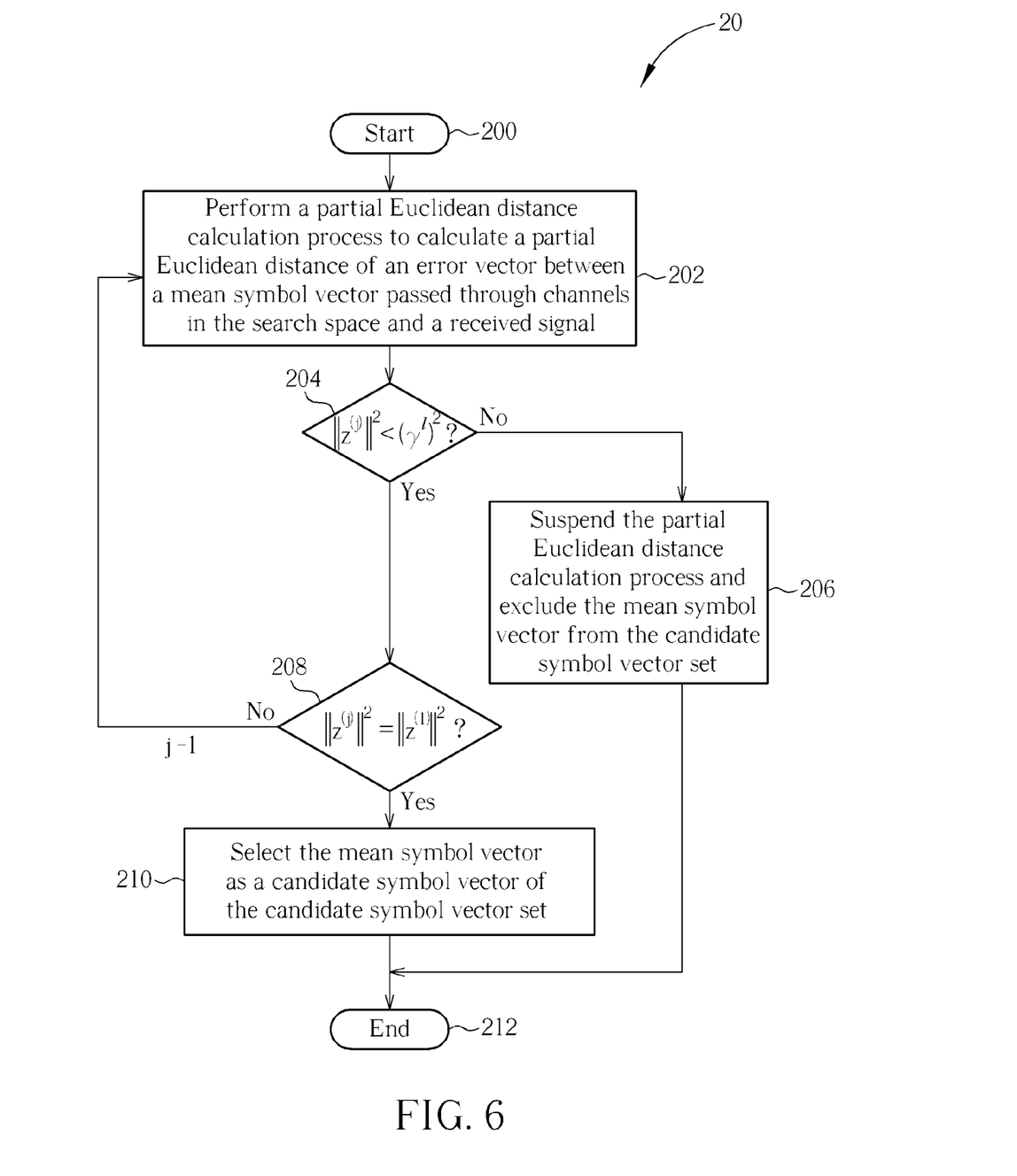
FIG. 6 is a flowchart diagram of a branch and bound method according to an embodiment of the present invention.

As can be seen, the branch and bound method performs search at $N_R$ levels. Please refer to FIG. 6, which is a flowchart of a branch and bound method 20 according to an embodiment of the present invention. The branch and bound method 20 is utilized in step 104 and step 110 of the MIMO detection method 10 in FIG. 3, for selecting mean symbol vectors conformed to the constraint. The branch and bound method 20 includes the following steps:

Step 200: Start.

Step 202: Perform a partial Euclidean distance calculation process to calculate a partial Euclidean distance of an error vector between a mean symbol vector passed through channels in the search space and a received signal.

Step 204: Compare the partial Euclidean distance and a search radius, for generating a comparing result. If the comparing result indicates that the partial Euclidean distance is larger than the search radius, perform step 206; otherwise, perform step 208.

Step 206: Suspend the partial Euclidean distance calculation process and exclude the mean symbol vector from the candidate symbol vector set.

Step 208: Determine whether the partial Euclidean distance calculation process is performed to calculate a full Euclidean distance. If yes, perform step 210; otherwise, return step 202, and add an element of the error vector to the partial Euclidean distance calculation process.

Step 210: Select the mean symbol vector as a candidate symbol vector of the candidate symbol vector set.

Step 212: End.

In step 202, the branch and bound method 20 performs the partial Euclidean distance calculation process to a mean symbol vector $x^{l,i}$ in the search space $\Pi^l$, which calculates the partial Euclidean distance $\|z^{(j)}\|$ of an error vector z between the mean symbol vector $x^{l,i}$ passed through channels and the received signal y, as shown in equation (13). Please note that, the embodiment of the preset invention initiates calculations from the minimal partial Euclidean distance, and increases a number of elements of the partial Euclidean distance gradually when the partial Euclidean distance calculation process is performed.

Firstly, the branch and bound method 20 calculates the partial Euclidean distance $\|z^{(N_R)}\|$ of the error vector z between the mean symbol vector $x^{l,i}$ passed through channels and the received signal y, and then in step 204 compares the partial Euclidean distance $\|z^{(N_R)}\|$ and the search radius $\gamma^l$, as shown in equation (14). The branch and bound method 20 confirms that the mean symbol vector $x^{l,i}$ does not conform to the constraint if the comparing result indicates that the partial Euclidean distance $\|z^{(N_R)}\|$ of the error vector z is larger than the search radius $\gamma^l$, and thereby performs step 210 for suspending the partial Euclidean distance calculation process. In other words, a possibility of the mean symbol vector $x^{l,i}$ being a candidate symbol vector is eliminated. On the other hand, in step 206, the partial Euclidean distance calculation process is performed to calculate a full Euclidean distance if the comparing result indicates that the partial Euclidean distance $\|z^{(N_R)}\|$ of the error vector z is smaller than the search radius $\gamma^l$. The branch and bound method 20 performs the partial Euclidean distance calculation process again because the MIMO system includes multiple received antennas, and returns step 202 for adding an element $z_{N_r-1}$ of the error vector z to the partial Euclidean distance calculation process, calculating the partial Euclidean distance $\|z^{(N_R-1)}\|$ of the error vector z, and comparing with the search radius $\gamma^l$ recursively. The branch and bound method 20 finally selects the mean symbol vector $x^{l,i}$ as a candidate symbol vector when the partial Euclidean distance calculation process is performed to calculate the full Euclidean distance $\|z^{(1)}\|$, and $\|z^{(1)}\|$ is confirmed to be smaller than the search radius $\gamma^l$.

Note that, the branch and bound method 20 is used for illustrating the partial Euclidean distance calculation process corresponding to a single mean symbol vector. In reality, the present invention applies breadth-first manner to perform the partial Euclidean distance calculation process to all mean symbol vectors in the search space $\Pi^l$, and finally generates the candidate symbol vector set $\Omega^l$. Since the branch and bound method 20 can determine whether the mean symbol vector $x^{l,i}$ is conformed to the constraint only by calculating the partial Euclidean distance of the error vector, the complexity of system calculation and the search space can be reduced.

For the branch and bound method 20, since a value of the candidate symbol vector set is not a constant value at each level of cluster matching, the complexity of the system is still needed to be improved. The present invention further sorts all mean symbol vectors of the candidate symbol vector set generated by the branch and bound method 20 in order according to Euclidean distances of error vectors corresponding to all mean symbol vectors, and then selects K mean symbol vectors corresponding to error vectors with minimal Euclidean distances, for forming an optimum candidate symbol vector set. Briefly, the present invention selects K mean symbol vectors from the remained mean symbol vectors, to effectively reduce the complexity of system. A value of K at each level of cluster matching stage can be different in other embodiments of the present invention.

Figure 7:
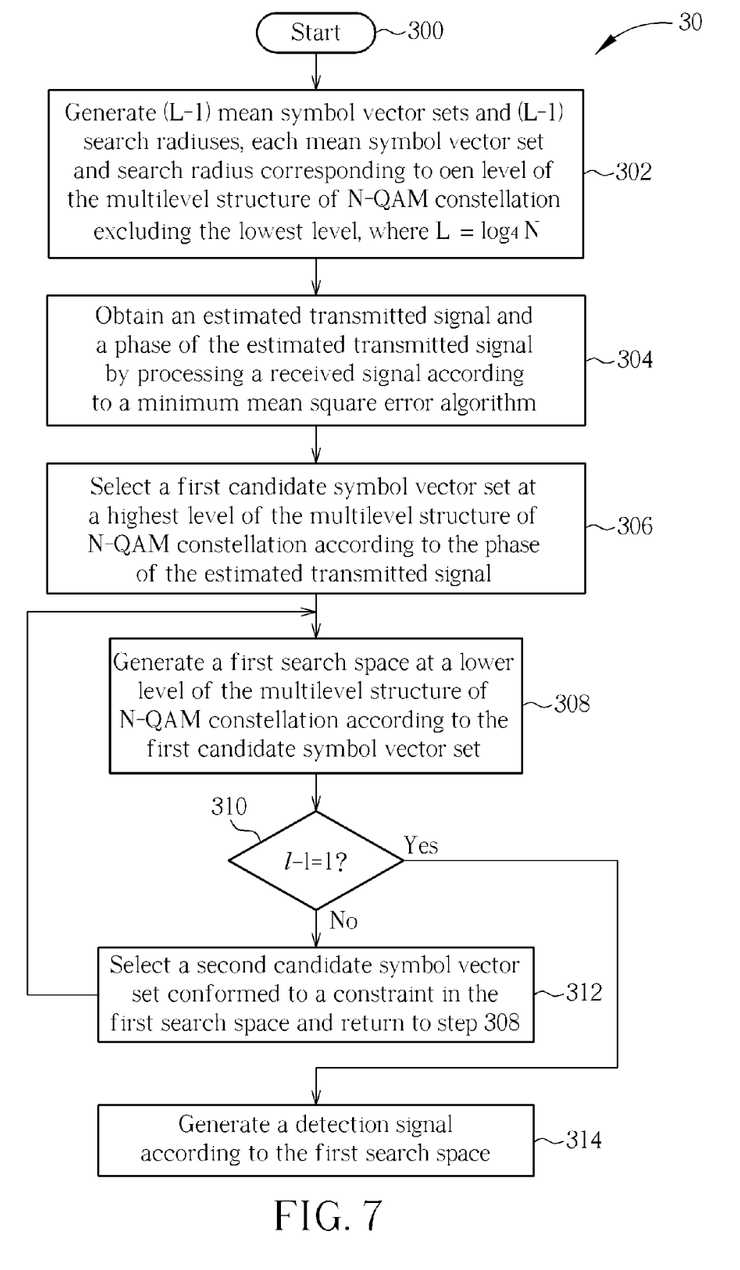
FIG. 7 is a flowchart diagram of a MIMO detection method according to an embodiment of the present invention.

In the MIMO detection method 10, cluster matching at the each of preceding (L−1) levels utilizes the constraint to search the candidate symbol vector set. The present invention further provides a phase decision method which can greatly reduce the complexity based on a phase of the transmitted signal to determine a result of cluster matching at the highest level. Please refer to FIG. 7, which is a flowchart of a MIMO detection method 30 according to a second embodiment of the present invention. The MIMO detection method 30 includes the following steps:

Step 300: Start.

Step 302: Generate (L−1) mean symbol vector sets and (L−1) search radiuses, each mean symbol vector set and search radius corresponding to one level of the multilevel structure of N-QAM constellation excluding the lowest level, where $L = \log_4 N$.

Step 304: Obtain an estimated transmitted signal and a phase of the estimated transmitted signal by processing a received signal according to a minimum mean square error algorithm.

Step 306: Select a first candidate symbol vector set at a highest level of the multilevel structure of N-QAM constellation according to the phase of the estimated transmitted signal.

Step 308: Generate a first search space at a lower level of the multilevel structure of N-QAM constellation according to the first candidate symbol vector set.

Step 310: Confirm which level of the multilevel structure of N-QAM constellation the first search space corresponds to. Perform step 314 if the level is the lowest level of the multilevel structure of N-QAM constellation; otherwise perform step 312.

Step 312: Select a second candidate symbol vector set conformed to a constraint in the first search space and return to step 308.

Step 314: Generate a detection signal according to the first search space.

Step 316: End.

Step 304 to step 312 illustrate cluster matching stage, wherein the step 304 and step 306 illustrate cluster matching at the highest level, the step 308 to step 312 are performed as a loop for cluster matching level by level, and step 310 is used for conforming whether the cluster matching stage is completed. Step 314 illustrates detail matching stage at the lowest level. The phase decision method is divided into two stages, such as shown in step 304 and step 306. In step 304, the phase decision method processes the received signal y by minimum mean square error algorithm for obtaining the estimated transmitted signal $\hat{x}_{MMSE}$, and calculates phase $\theta(\hat{x}_{MMSE})$ of each element of the transmitted signal $\hat{x}_{MMSE}$, where $\hat{x}_{MMSE}$ and $\theta(\hat{x}_{MMSE})$ are expressed as:

$$\hat{x}_{MMSE}=(H^H H+\sigma^2 I)^{-1}H^H y=[\hat{x}_1, \hat{x}_2, \ldots, \hat{x}_j, \ldots, \hat{x}_{N_T}]^T; \quad (18)$$

$$\theta(\hat{x}_{MMSE})=(\theta(\hat{x}_1), \theta(\hat{x}_2), \ldots, \theta(\hat{x}_j), \ldots, \theta(\hat{x}_{N_T})), \quad (19)$$

In equation (18), I is an identity matrix, $\sigma^2$ is a variance of noise, and the element $\hat{x}_j$ of the estimated transmitted signal $\hat{x}_{MMSE}$ corresponds to the $j^{th}$ transmitted antenna. For an element corresponding to an antenna, the mean symbol vector set at the highest level of the multilevel structure of N-QAM constellation is indicated as A, B, C, and D according to four quadrants of I-Q plane. In step 308, the phase decision method selects a candidate symbol vector set $\Omega^L$ according to the phase $\theta(\hat{x}_{MMSE})$ of the estimated transmitted signal. Moreover, the phase decision method selects two or three mean symbol vectors from the mean symbol vector set {A, B, C, D} as possible values of an element $x_j^{L,i}$ of a mean symbol vector $x^{L,i}=[x_1^{L,i}, x_2^{L,i}, \ldots, x_{N_T}^{L,i}]$ of the candidate symbol vector set $\Omega^L$, which can be called two-phase decision method or three-phase decision method, according to a range of phase $\theta(\hat{x}_j)$ of an element $\hat{x}_j$ of the transmitted signal $\hat{x}_{MMSE}$. $\Delta_2(x_j^{L,i})$ and $\Delta_3(x_j^{L,i})$ are defined as combinations of all possible symbol vectors of the element $x_j^{L,i}$, which is respectively obtained from two or three of four mean symbol vector set {A, B, C, D}. The range of $\Delta_2(x_j^{L,i})$, $\Delta_3(x_j^{L,i})$, and the corresponding element $\theta(\hat{x}_j)$ are expressed as:

$$\Delta_2(x_j^{L,i}) = \begin{cases} \{A, B\}, & \text{if } \frac{\pi}{4} \leq \theta(\hat{x}_j) \leq \frac{3\pi}{4} \\ \{B, C\}, & \text{if } \frac{3\pi}{4} \leq \theta(\hat{x}_j) \leq \pi \text{ or } (-\pi) \leq \theta(\hat{x}_j) \leq \frac{-3\pi}{4} \\ \{C, D\}, & \text{if } \frac{-3\pi}{4} \leq \theta(\hat{x}_j) \leq \frac{-\pi}{4} \\ \{A, D\}, & \text{if } 0 \leq \theta(\hat{x}_j) \leq \frac{\pi}{4} \text{ or } \frac{-\pi}{4} \leq \theta(\hat{x}_j) \leq 0 \end{cases} \quad (20)$$

$$\Delta_3(x_j^{L,i}) = \begin{cases} \{A, B, D\}, & \text{if } 0 \leq \theta(\hat{x}_j) \leq \frac{\pi}{2} \\ \{A, B, C\}, & \text{if } \frac{\pi}{2} \leq \theta(\hat{x}_j) \leq \pi \\ \{A, C, D\}, & \text{if } \frac{-\pi}{2} \leq \theta(\hat{x}_j) \leq 0 \\ \{B, C, D\}, & \text{if } (-\pi) \leq \theta(\hat{x}_j) \leq \frac{-\pi}{2} \end{cases} \quad (21)$$

As can be seen in equation (20), each element of mean symbol vector $x^{L,i}$ of candidate symbol vector set $\Omega^L$ can be an element of a combination of $\Delta_2(x_j^{L,i})$ if the present invention uses two-phase decision method to select candidate symbol vector set $\Omega^L$. Therefore, candidate symbol vector set $\Omega^L$ includes $2^{N_T}$ mean symbol vectors. Likewise, candidate symbol vector set $\Omega^L$ includes $3^{N_T}$ mean symbol vectors if the present invention uses three-phase decision method to select candidate symbol vector set $\Omega^L$. Please note that, the MIMO detection method 30 can use two or three-phase decision method for the highest level cluster matching according to a demand of the system. In a case of a large number of antennas and using high order QAM, the three-phase decision method has better performance than the two-phase decision method. After the highest level cluster matching is completed, cluster matching described in step 308 to step 312 and detail matching stage in step 314 are similar to step 106 step 112 of the MIMO detection method 10. Therefore, the detail description is omitted herein.

A difference between The MIMO detection method 10 and the MIMO detection method 10 is a way of the highest level cluster matching. For the MIMO detection method 10, the highest level cluster matching includes step 104, and for the MIMO detection method 30, the highest level cluster matching includes step 304 and step 306, which are both utilized for selecting the candidate symbol vector set at the highest level of the multilevel structure of N-QAM constellation.

Figure 8:
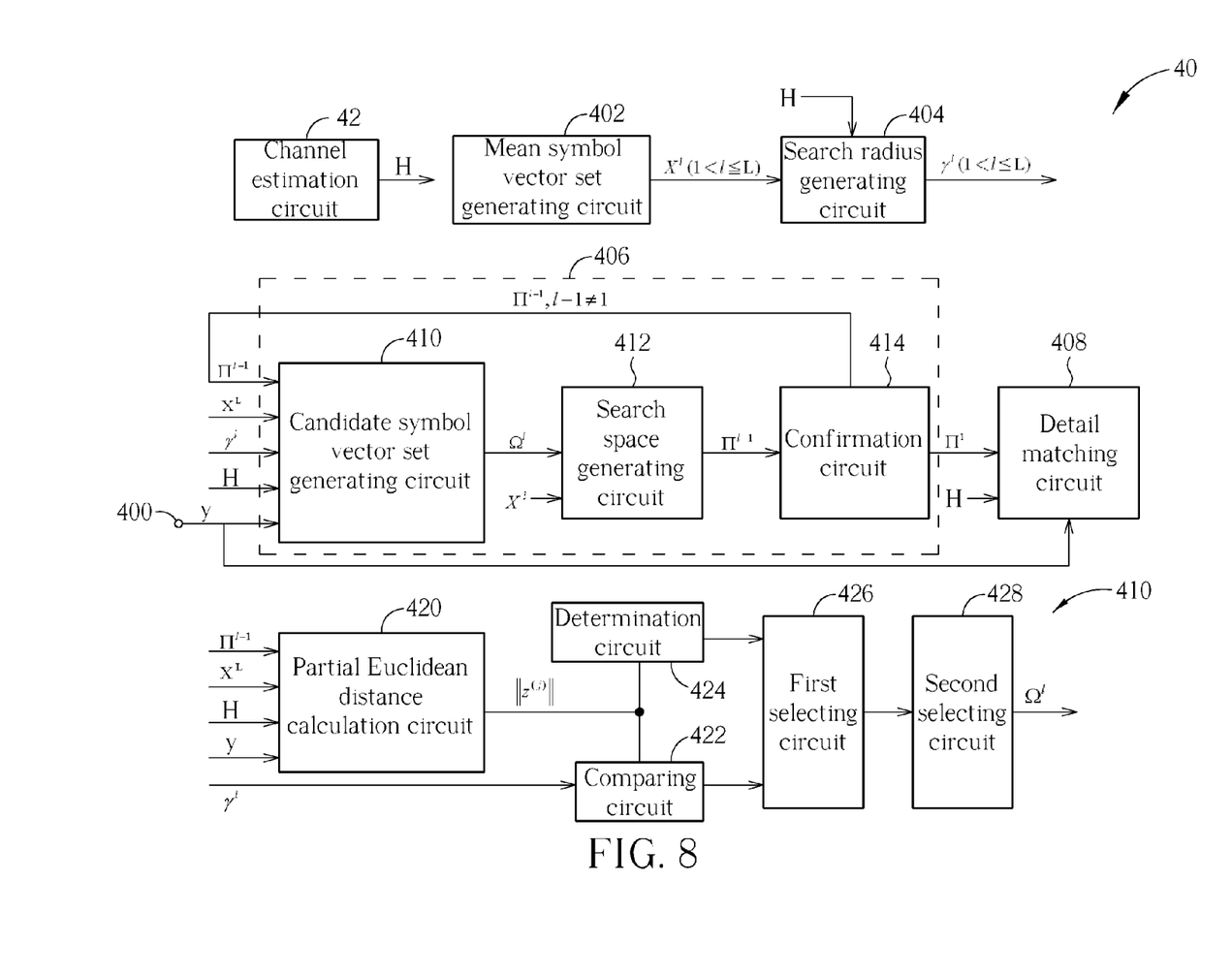
FIGS. 8 and 9 are functional block diagrams of MIMO detectors according to embodiments of the present invention.

Please refer to FIG. 8 for hardware implementation of the MIMO detection method 10, which is a functional block diagram of a MIMO detector 40 according to an embodiment of the present invention. The MIMO detector 40 is utilized in a receiver of a $N_T \times N_R$ MIMO system, and the $N_T \times N_R$ MIMO system utilizes N-QAM to modulate desired transmitted data stream. The MIMO detector 40 includes a receiving terminal 400, a mean symbol vector set generating circuit 402, a search radius generating circuit 404, a cluster matching circuit 406, and a detail matching circuit 408. For the detailed operation of the MIMO detector 40, please refer to the description of the MIMO detection method 10.

The receiving terminal 400 is used for receiving received signal y indicated as $y=[y_1, y_2, \ldots y_j, \ldots, y_{N_R}]^T$ received by received antenna array of the MIMO receiver. The mean symbol vector set generating circuit 402 and the search radius generating circuit 404 is used for performing step 102 in the MIMO detection method 10. The mean symbol vector set generating circuit 402 generates a plurality of mean symbol vector sets $X^l(1<l\leq L)$ each corresponds to a level of a multilevel structure of N-QAM constellation excluding the lowest level. The search radius generating circuit 404 is coupled to the mean symbol vector set generating circuit 402 and a channel estimation circuit 42 of the MIMO receiver. The channel estimation circuit 42 is used for generating a channel matrix H, and the search radius generating circuit 404 is used for generating a plurality of search radiuses $\gamma^l$ $(1<l\leq L)$ each corresponds to a level of the multilevel structure of N-QAM constellation excluding the lowest level.

The cluster matching circuit 406 is used for performing the cluster matching stage, which includes a candidate symbol vector set generating circuit 410, a search space generating circuit 412, and a confirmation circuit 414. The candidate symbol vector set generating circuit 410 is coupled to the receiving terminal 400, the mean symbol vector set generating circuit 402, the search radius generating circuit 404, the channel estimation circuit 42, the confirmation circuit 414, and the search space generating circuit 412. The candidate symbol vector set generating circuit 410 is used for performing step 104 and step 110, selecting a candidate symbol vector set $\Omega^l$ conformed to a constraint in search space $\Pi^l$ at the $l^{th}$ level of the multilevel structure of N-QAM constellation, which can be an initial search space $\Pi^L=X^L$ and a search space $\Pi^l$, where $1<l\leq L$. The search space generating circuit 412 is coupled to the mean symbol vector set generating circuit 402 and the candidate symbol vector set generating circuit 410, and is used for performing step 106 for generating a search space $\Pi^{l-1}$ one level lower than the search space $\Pi^l$ according to the candidate symbol vector set $\Omega^l$. The confirmation circuit 414 is coupled to the search space generating circuit 412, and is used for performing step 108 to confirm a level of the search space, for determining to enter the detail matching stage or a lower level cluster matching. The detail matching circuit 408 is coupled to the receiving terminal 100, the channel estimation circuit 42, and the confirmation circuit 414, and is used for performing the detail matching and generating a detection signal according to the search space when the confirmation circuit 414 confirms a level of the search space $\Pi^{l-1}$ is the lowest level (l−1=1).

Moreover, circuits included in the candidate symbol vector set generating circuit 410 can be used for performing the abovementioned branch and bound method 20. The candidate symbol vector set generating circuit 410 includes a partial Euclidean distance calculation circuit 420, a comparing circuit 422, a determination circuit 424, a first selecting circuit 426, and a second selecting circuit 428. The partial Euclidean distance calculation circuit 420 is coupled to the receiving terminal 400, the mean symbol vector set generating circuit 402, the channel estimation circuit 42 and the confirmation circuit 414, and is used for performing step 202 of the branch and bound method 20, for calculating the partial Euclidean distance of the error vector. The comparing circuit 422 is coupled to the partial Euclidean distance calculation circuit 420 and the search radius generating circuit 404, and is used for perform step 204, for comparing the partial Euclidean distance $\|z^{(l)}\|$ and the search radius $\gamma^l$ for generating a comparing result. The determination circuit 424 is coupled to the partial Euclidean distance calculation circuit 420, and is used for performing step 206, for determining whether the partial Euclidean distance calculation circuit 420 is performed to calculate the full Euclidean distance $\|z^{(1)}\|$, for generating a determined result. The first selecting circuit 426 is coupled to the comparing circuit 422 and determination circuit 424, and is used for selecting the candidate symbol vector set $\Omega^l$ according to the comparing result and determined result. The second selecting circuit 428 is coupled to the first selecting circuit 426, and is used for selecting K mean symbol vectors corresponding to error vectors with minimal Euclidean distances from the candidate symbol vector set $\Omega^l$, to form an optimum candidate symbol vector set.

Figure 9:
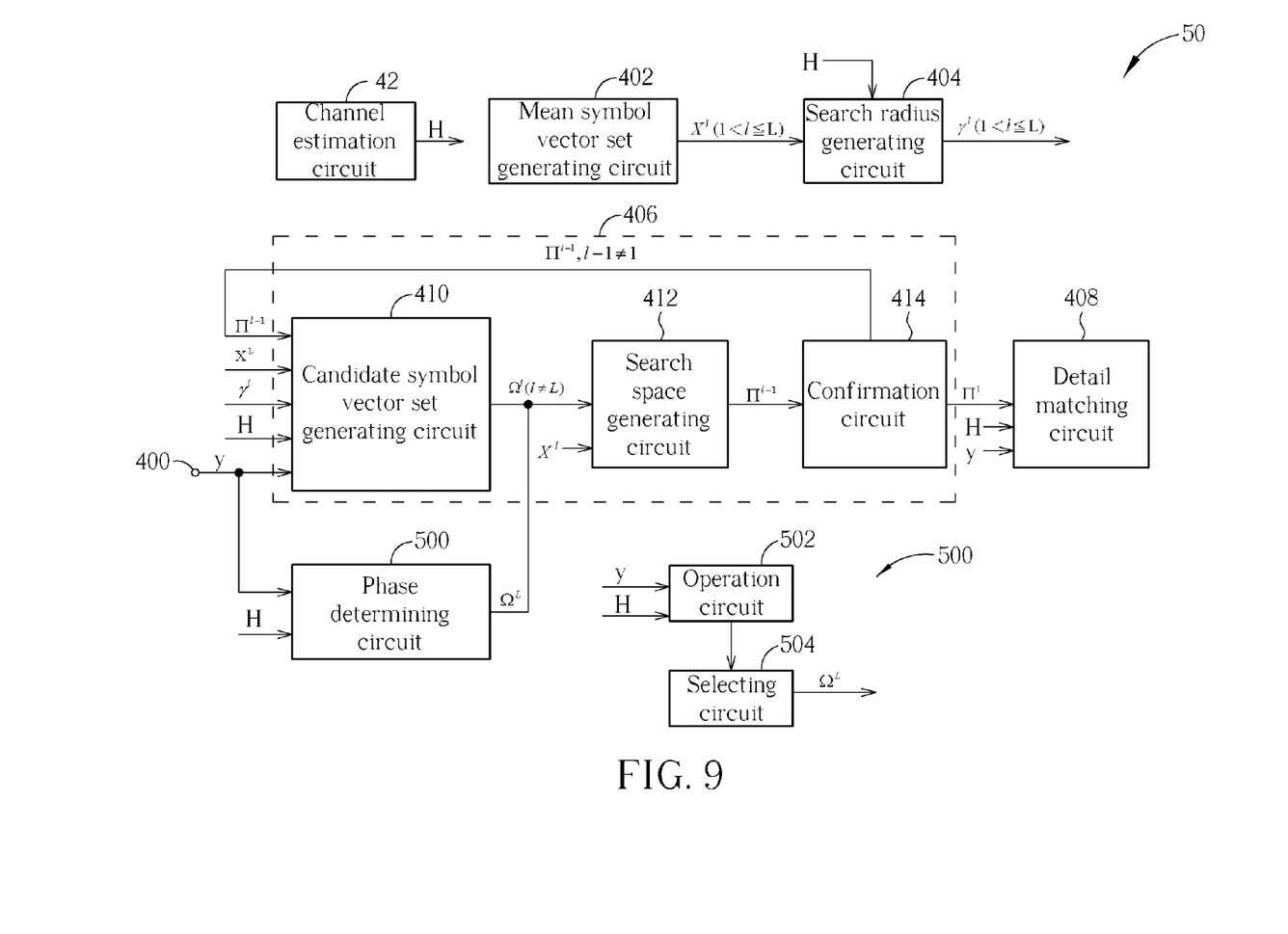

In addition, upon hardware implementation of the MIMO detection method 30, please refer to FIG. 9, which is a functional block diagram of a MIMO detector 50 according to an embodiment of the present invention. The MIMO detector 50 does not only including all circuits of the MIMO detector 40, and further includes a phase determining circuit 500 used for selecting a candidate symbol vector set $\Omega^L$ at the highest level of the multilevel structure of N-QAM constellation. In addition to the highest level, the candidate symbol vector set $\Omega^l$ (1<l<L) at other levels are completed by the cluster matching circuit 406 of the MIMO detector 50. The phase determining circuit 500 includes an operation circuit 502 and a selecting circuit 504. The operation circuit 502 is coupled to the receiving terminal 400 and the channel estimation circuit 42, and is used for performing step 304 of the MIMO detection method 30, for obtaining an estimated transmitted signal and a phase of the estimated transmitted signal according to the minimum mean square error algorithm processing the received signal y. The selecting circuit 504 is coupled to the operation circuit 502, and is used for selecting the candidate symbol vector set $\Omega^L$ according to the phase of the estimated transmitted signal. Therefore, the search space generating circuit 412 of the MIMO detector 50 is coupled to the phase determining circuit 500 besides the mean symbol vector set generating circuit 402 and the candidate symbol vector set generating circuit 410. A detail operation of the MIMO detector 50 can be referred to the MIMO detection method 30 and 40, and thereby the detail description is omitted herein.

In conclusion, the MIMO detection method and the MIMO detector of the present invention utilizes a characteristic of the multilevel structure of N-QAM constellation for performing multilevel cluster matching in the received signal space to reduce the search space quickly, and generating the detection signal by the lowest level detail matching for a back end decoding. In addition, the present invention provides the branch and bound method, a method of selecting the optimum K candidate symbol vectors, and phase decision method, which can reduce the complexity of cluster matching and enhance the efficiency of MIMO detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multiple-input multiple-output (MIMO) detection method for a receiver in a MIMO system using N-quadrature amplitude modulation (N-QAM), the method programming a processor circuit to implement the method, the method comprising:
    generating a plurality of symbol vector sets and a plurality of search radiuses, each symbol vector set and search radius correspond to one level of a multilevel structure of N-QAM constellation;
    selecting a first candidate symbol vector set at a highest level of the multilevel structure;
    generating a first search space at a lower level of the multilevel structure according to the first candidate symbol vector set;
    selecting a second candidate symbol vector set conformed to a constraint in the first search space when the level of the first search space is not the lowest level of the multilevel structure, wherein the constraint corresponds to the level of the first search space, wherein the constraint comprises a Euclidean distance of an error vector between each symbol vector of the first candidate symbol vector set passed through channels and a received signal is smaller than one of the plurality of search radiuses;
    generating a second search space according to the second candidate symbol vector set, wherein the level of the second search space is lower than the level of the first search space;
    confirming which level the first search space corresponds to; and
    generating a detection signal according to the first search space when the first search space is the lowest level of the multilevel structure, wherein generating the detection signal more specifically comprises performing one of the following operations: (1) calculating Euclidean distances of a plurality of error vectors, or (2) using a maximum likelihood algorithm in the search space for selecting a symbol vector.

2. The method of claim 1, wherein each search radius is the product of the Euclidean distance and a noise reduction parameter.

3. The method of claim 1, wherein the step of selecting the first candidate symbol vector set comprises:
    selecting the first candidate symbol vector set conformed to an initial constraint corresponding to the highest level of the multilevel structure.

4. The method of claim 1, wherein the step of selecting the first candidate symbol vector set comprises:
    performing a partial Euclidean distance calculation process in order to calculate a partial Euclidean distance of an error vector; and
    selecting the first candidate symbol vector set according to the partial Euclidean distance.

5. The method of claim 1, wherein the step of selecting the first candidate symbol vector set comprises:
- processing a received signal to generate an estimated transmitted signal and a phase of the estimated transmitted signal; and
- generating the first candidate symbol vector set according to a phase of the estimated transmitted signal.

6. The method of claim 5, wherein the step of generating the first candidate symbol vector set comprises:
- selecting two or three mean symbol vectors from the mean symbol vector set at the highest level of the multilevel structure as possible values of an element of the estimated transmitted signal according to a range of a phase of the element, for generating the first candidate symbol vector set.

7. The method of claim 1, wherein the step of generating the detection signal comprises:
- selecting a symbol vector as the detection signal in the first search space.

8. The method of claim 1, wherein the step of generating the detection signal comprises:
- calculating Euclidean distances of the plurality of error vectors;
- sorting the plurality of symbol vectors in the first search space in order according to values of Euclidean distances of the plurality of error vectors; and
- selecting a first amount of symbol vectors from the plurality of symbol vectors to generate the detection signal.

9. A multiple-input multiple-output (MIMO) detecting apparatus for a receiver in a MIMO system using N-quadrature amplitude modulation (N-QAM), the apparatus comprising:
- a receiving terminal for receiving a signal;
- a mean symbol vector set generating circuit, to generate a plurality of mean symbol vector sets each corresponds to a level of a multilevel structure of N-QAM constellation;
- a search radius generating circuit, to generate a plurality of search radiuses each corresponds to a level of the multilevel structure according to the plurality of mean symbol vector sets and a channel matrix, wherein each of the plurality of search radiuses is the product of a Euclidean distance, the largest value of Euclidean distances of all constraint vectors at the level of the search radius passed through channels, and a noise reduction parameter varied according to the level of the multilevel structure of N-QAM constellation;
- a cluster matching circuit comprising:
- a search space generating circuit, to generate a search space according to a candidate symbol vector set at the level of the multilevel structure;
- a confirmation circuit, to confirm which level of the multilevel structure the search space corresponds to; and
- a candidate symbol vector set generating circuit, to select the candidate symbol vector set conformed to the constraint corresponding to the level of the search space; and
- a detail matching circuit, to generate a detection signal according to the search space when the level of the search space is the lowest level of the multilevel structure.

10. The apparatus of claim 9, wherein a search space at the highest level of the multilevel structure of N-QAM constellation corresponds to the mean symbol vector set at the highest level.

11. The apparatus of claim 9, wherein the Euclidean distance of an error vector is smaller than the search radius.

12. The apparatus of claim 9, wherein the candidate symbol vector set generating circuit comprise:
- a partial Euclidean distance calculation circuit, to generate a partial Euclidean distance of an error vector;
- a comparing circuit, to compare the partial Euclidean distance and the corresponding search radius to generate a comparing result;
- a determination circuit, to determine whether the partial Euclidean distance calculation process is performed to calculate a full Euclidean distance to generate a determined result; and
- a first selecting circuit, to generate the candidate symbol vector set according to the comparing result and the determined result.

13. The apparatus of claim 9, wherein the detail matching circuit selects a symbol vector as the detection signal when the level of the search space is the lowest level of the multilevel structure.

14. The apparatus of claim 9, wherein when the level of the search space is the lowest level of the multilevel structure, the detail matching circuit calculates Euclidean distances of a plurality of error vectors, sorts the plurality of symbol vectors in the search space in order according to values of the Euclidean distances, and selects a first amount of symbol vectors from the plurality of symbol vectors to generate the detection signal.

15. The apparatus of claim 9, further comprising:
- a phase determining circuit, to select a candidate symbol vector set at the highest level of the multilevel structure of N-QAM constellation.

16. A multiple-input multiple-output (MIMO) detection method for a receiver in a MIMO system using N-quadrature amplitude modulation (N-QAM), the method programming a processor circuit to implement the method, the method comprising:
- generating a plurality of symbol vector sets and a plurality of search radiuses, each symbol vector set and search radius correspond to one level of a multilevel structure of N-QAM constellation;
- selecting a first candidate symbol vector set at a highest level of the multilevel structure;
- generating a first search space at a lower level of the multilevel structure according to the first candidate symbol vector set;
- selecting a second candidate symbol vector set conformed to a constraint in the first search space when the level of the first search space is not the lowest level of the multilevel structure, wherein the constraint corresponds to the level of the first search space, wherein the step of selecting the second candidate symbol vector set comprises:
  - performing a partial Euclidean distance calculation process to calculate a partial Euclidean distance of an error vector;
  - determining whether the partial Euclidean distance calculation process is performed to calculate a full Euclidean distance, for generating a determined result; and
  - selecting the second candidate symbol vector set according to the partial Euclidean distance and the determined result;
- generating a second search space according to the second candidate symbol vector set, wherein the level of the second search space is lower than the level of the first search space;
- confirming which level the first search space corresponds to; and generating a detection signal according to the first search space when the first search space is the lowest level of the multilevel structure, wherein generating the detection signal more specifically comprises performing one of the following operations: (1) calculating Euclidean distances of a plurality of error vectors, or (2) using a maximum likelihood algorithm in the search space for selecting a symbol vector.

* * * * *